(12) United States Patent
Bitauld et al.

(10) Patent No.: US 11,114,706 B2
(45) Date of Patent: Sep. 7, 2021

(54) LIQUID DETECTION INSIDE A BATTERY TRAY TO AVOID BATTERY MALFUNCTION

(71) Applicant: Dura Operating, LLC, Auburn Hills, MI (US)

(72) Inventors: Lionel Bitauld, Gif sur Yvette (FR); Joseph Bosnjak, Jouars Pontchartrin (FR)

(73) Assignee: DUS Operating, LLC, Auburn Hills, MI (US)

( * ) Notice: Subject to any disclaimer, the term of this patent is extended or adjusted under 35 U.S.C. 154(b) by 364 days.

(21) Appl. No.: 15/798,889

(22) Filed: Oct. 31, 2017

(65) Prior Publication Data

US 2019/0131668 A1 May 2, 2019

(51) Int. Cl.
| | |
|---|---|
| *H01M 10/48* | (2006.01) |
| *B60L 3/00* | (2019.01) |
| *H01M 10/42* | (2006.01) |
| *B60L 50/64* | (2019.01) |
| *H01M 50/20* | (2021.01) |
| *H02H 5/08* | (2006.01) |

(52) U.S. Cl.
CPC .......... *H01M 10/48* (2013.01); *B60L 3/0046* (2013.01); *B60L 50/64* (2019.02); *H01M 10/425* (2013.01); *H01M 10/4228* (2013.01); *H01M 50/20* (2021.01); *B60Y 2400/308* (2013.01); *B60Y 2400/3019* (2013.01); *H01M 2010/4278* (2013.01); *H01M 2200/00* (2013.01); *H01M 2220/20* (2013.01); *H02H 5/083* (2013.01)

(58) Field of Classification Search
CPC .......... H01M 2/1077; H01M 10/4228; H01M 10/48; H01M 2220/20; B60Y 2400/3019; B60Y 2400/308
See application file for complete search history.

(56) References Cited

U.S. PATENT DOCUMENTS

| | | | |
|---|---|---|---|
| 2011/0256432 A1 | 10/2011 | TenHouten et al. | |
| 2014/0026652 A1* | 1/2014 | Cummins | ............ G01N 27/223 73/335.04 |

(Continued)

FOREIGN PATENT DOCUMENTS

| | | | |
|---|---|---|---|
| CA | 2782401 | * | 6/2011 |
| EP | 3418102 A1 | | 12/2018 |
| EP | 3418103 A1 | | 12/2018 |

(Continued)

*Primary Examiner* — Ula C Ruddock
*Assistant Examiner* — Thomas H. Parsons
(74) *Attorney, Agent, or Firm* — Vivacqua Crane (57) ABSTRACT

A vehicle battery safety sensor system providing liquid detection inside a battery pack includes a battery pack having a structure defining a battery cell bay receiving a battery. A first sensor is mounted to the structure proximate to a low point area of the battery cell bay for sensing an operating condition within the low point area of the battery cell bay. A second sensor is mounted to the structure elevated above the first sensor for sensing an operating condition above the low point area of the battery cell bay. A safety module processes signals received from the first sensor and the second sensor and identifies if the operating condition within the low point area of the battery cell bay defines a fluid present in the low point area of the battery cell bay.

5 Claims, 5 Drawing Sheets (56) References Cited

U.S. PATENT DOCUMENTS

2016/0141572 A1  5/2016  Nakayama
2017/0000968 A1  1/2017  Harrington et al.

FOREIGN PATENT DOCUMENTS

| EP | 3418104 A1 | | 12/2018 | |
|---|---|---|---|---|
| KR | 1020140037305 A | | 3/2014 | |
| KR | 20140093123 | * | 7/2014 | |
| KR | 20140093123 A | * | 7/2014 | |
| WO | WO-2012096844 A1 | * | 7/2012 | .......... H01M 2/0237 |

* cited by examiner

LIQUID DETECTION INSIDE A BATTERY TRAY TO AVOID BATTERY MALFUNCTION

FIELD

The present disclosure relates generally to vehicle system condition sensing and vehicle system condition transmission systems, including battery cell bay liquid detection.

BACKGROUND

The statements in this section merely provide background information related to the present disclosure and may or may not constitute prior art.

Automobile vehicles including electric vehicles and hybrid vehicles providing at least partial propulsion from battery power create unique conditions that must be considered due to the energy and fluid in the battery packs provided with the vehicle when the vehicle is disabled or in an accident. A first responder such as a fire truck or tow vehicle which approaches a battery or hybrid powered vehicle should be made aware of the presence of a battery pack and the possibility of fluid in the battery pack to reduce possible spark and fire conditions.

The battery packs of known battery powered and hybrid or battery-engine powered vehicles, hereinafter collectively referred to as "battery powered" vehicles, do not provide sensors which can distinguish relative humidity levels within the battery pack.

Thus, while current vehicle battery pack systems achieve their intended purpose, there is a need for a new and improved system and method for identifying vehicle battery pack fluid presence.

SUMMARY

According to several aspects, a vehicle battery safety sensor system providing liquid detection inside a battery pack includes a battery pack having a structure defining a battery cell bay receiving a battery. A first sensor is mounted to the structure proximate to a low point area of the battery cell bay sensing a condition within the low point area of the battery cell bay. A second sensor is mounted to the structure sensing a condition within the battery cell bay outside of the low point area of the battery cell bay; and a safety module processing signals received from the first sensor and the second sensor.

In another aspect of the present disclosure, the first sensor and the second sensor each define a capacitance sensor, and the second sensor is elevated above the first sensor.

In another aspect of the present disclosure, if a capacitance of the first sensor equals a capacitance of the second sensor the condition in the battery cell bay is defined as no fluid present in the battery cell bay.

In another aspect of the present disclosure, if a predetermined capacitance difference between a capacitance of the first sensor and a capacitance of the second sensor exceeds a predetermined threshold the condition in the battery cell bay is defined as a fluid present in the battery cell bay.

In another aspect of the present disclosure, the safety module generates a fluid present signal when the fluid is present in the battery cell bay.

In another aspect of the present disclosure, the first sensor and the second sensor each define a moisture sensor, and the second sensor is elevated above the first sensor.

In another aspect of the present disclosure, when a predetermined relative humidity difference indicated by a signal from the first sensor differing from a signal from the second sensor exceeds a first threshold, and when a relative humidity indicated by the signal from the first sensor is higher than a second threshold the condition in the battery cell bay is defined as a fluid present in the battery cell bay.

In another aspect of the present disclosure, the second threshold defines a relative humidity above approximately 95%.

In another aspect of the present disclosure, the first sensor and the second sensor are both mounted to a first wall of the structure.

In another aspect of the present disclosure, the safety module is disposed outside of the structure.

According to several aspects, a vehicle battery safety sensor system providing liquid detection inside a battery pack includes a battery pack having a structure defining a battery cell bay receiving a battery. A first sensor is mounted to the structure proximate to a low point area of the battery cell bay for sensing an operating condition within the low point area of the battery cell bay. A second sensor is mounted to the structure elevated above the first sensor for sensing an operating condition above the low point area of the battery cell bay. A safety module processes signals received from the first sensor and the second sensor and identifies if the operating condition within the low point area of the battery cell bay defines a fluid present in the low point area of the battery cell bay.

In another aspect of the present disclosure, the first sensor and the second sensor each define a capacitance sensor.

In another aspect of the present disclosure, the condition in the battery cell bay is defined as the fluid present in the battery cell bay when a predetermined capacitance difference between a capacitance of the first sensor and a capacitance of the second sensor exceeds a predetermined threshold.

In another aspect of the present disclosure, a capacitance-to-digital converter receives signals from each of the first sensor and the second sensor, the capacitance-to-digital converter is in communication with the safety module.

In another aspect of the present disclosure, the capacitance of the first sensor defines a liquid detection capacitance and the capacitance of the second sensor defines a reference capacitance.

In another aspect of the present disclosure, the predetermined capacitance difference between the capacitance of the first sensor and the capacitance of the second sensor is ratiometric to a liquid level in the in the low point area of the battery cell bay.

In another aspect of the present disclosure, the first sensor and the second sensor each define a moisture sensor; the second sensor is elevated above the first sensor; and when a predetermined relative humidity difference indicated by a signal from the first sensor differing from a signal from the second sensor exceeds a first threshold, and when a relative humidity indicated by the signal from the first sensor is higher than a second threshold the condition in the battery cell bay is defined as a fluid present in the battery cell bay.

According to several aspects, a vehicle battery safety sensor system providing liquid detection inside a battery pack includes a battery pack having a structure defining multiple battery cell bays each receiving at least one battery. Successive cross beams bound each of the battery cell bays with the at least one battery positioned between the successive cross beams. A first sensor is mounted to a first one of the cross beams of each of the multiple battery cell bays. The first sensor is positioned proximate to a low point area of the battery cell bay for sensing an operating condition within the low point area of the battery cell bay. A second sensor is also mounted to the first one of the cross beams of each of the multiple battery cell bays. The second sensor is elevated above the first sensor for sensing an operating condition above the low point area of the battery cell bay. A safety module processes signals received from the first sensor and the second sensor and identifies if the operating condition within the low point area of the battery cell bay defines a fluid present in the low point area of the battery cell bay. A body control management unit in communication with the safety module using a high speed CAN interface.

In another aspect of the present disclosure, the first sensor and the second sensor each define a capacitance sensor; and the condition in the battery cell bay is defined as the fluid present in the battery cell bay when a predetermined capacitance difference between a capacitance of the first sensor and a capacitance of the second sensor exceeds a predetermined threshold.

In another aspect of the present disclosure, the first sensor and the second sensor each define a moisture sensor; and when a predetermined relative humidity difference indicated by a signal from the first sensor differing from a signal from the second sensor exceeds a first threshold, and when a relative humidity indicated by the signal from the first sensor is higher than a second threshold the condition in the battery cell bay is defined as a fluid present in the battery cell bay.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
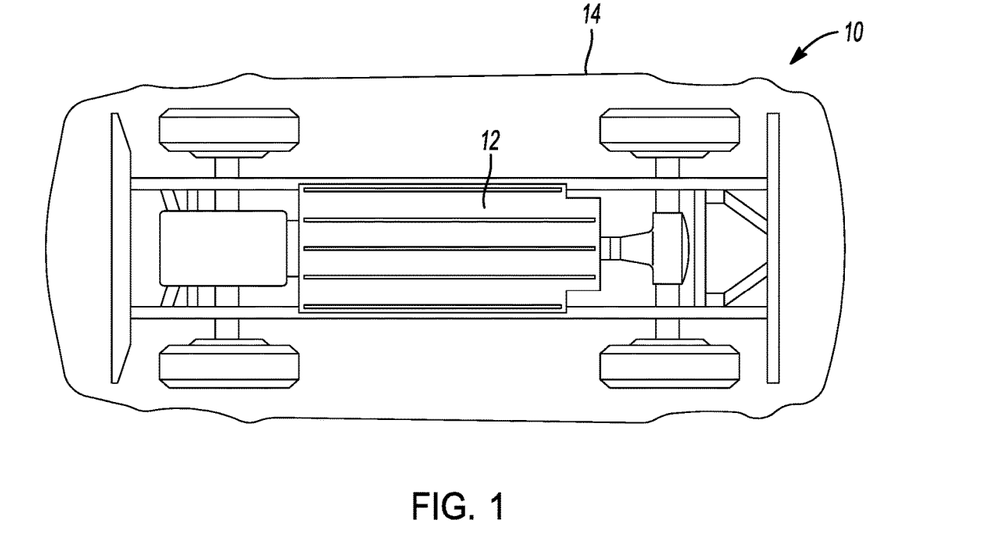
FIG. 1 is a rear left perspective view of an automobile vehicle having a battery pack safety system for a battery powered vehicle according to an exemplary embodiment.

Referring to FIG. 1, a vehicle battery safety sensor system 10 is incorporated with a battery unit or battery pack 12 mounted to a vehicle 14. The battery pack 12 may provide an electrical charge as the sole power to propel the vehicle 14, or may provide supplemental power in addition to an engine (not shown).

Referring to FIG. 2 and again to FIG. 1, the vehicle battery safety sensor system 10 together with the battery pack 12 are supported using a structural unit or frame 16 made for example from one or more materials such as a metal including aluminum, or a combination of materials such as a metal and a polymeric material or a composite material. The frame 16 may provide one or more mounting flanges 18 to connect the frame 16 to structure of the vehicle 14. The vehicle battery safety sensor system 10 further includes a stranded energy discharge module 20 permitting battery cell discharge in the event of an accident, and a battery emergency response module 22 which can provide signals locally or remotely for a vehicle and a battery emergency condition. The vehicle battery safety sensor system 10 further includes a safety module 24 which collects sensor data as described in reference to FIG. 5.

Figure 2:
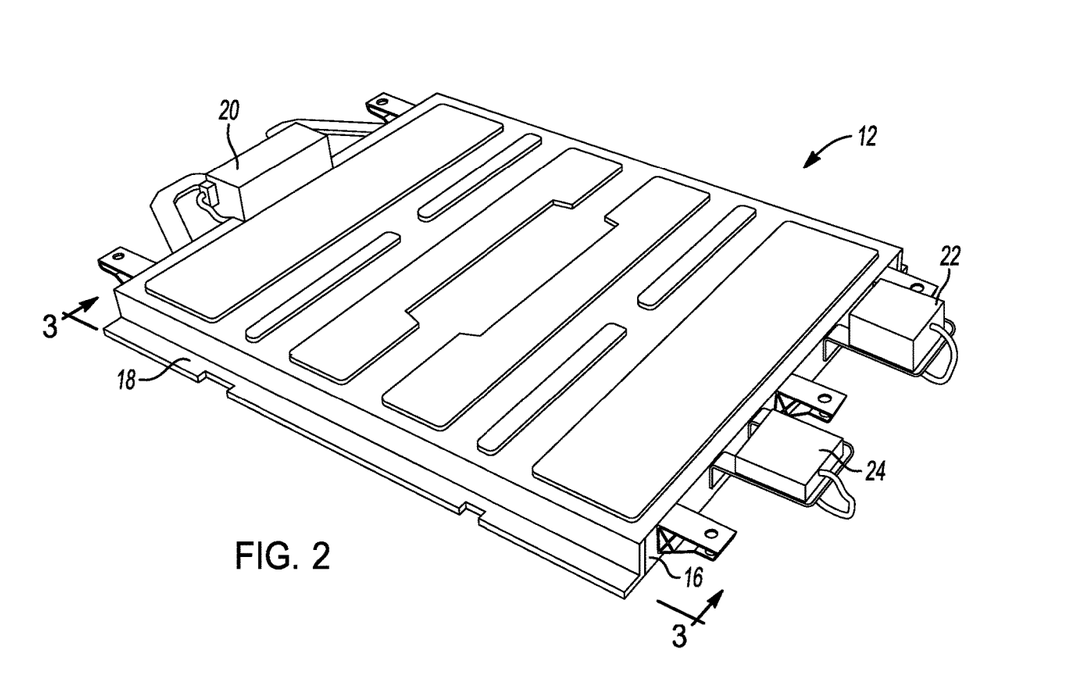
FIG. 2 is a top left perspective view of a battery pack of the present disclosure.

Referring to FIG. 3 and again to FIGS. 1 through 2, the frame 16 of the battery pack 12 includes multiple battery cell bays or chambers such as an exemplary battery cell bay 26 which may be bounded between successive cross beams 28, such as between cross beams 28(1), 28(2). Each of the battery cell bays 26 includes at least one battery cell 30.

Figure 3:
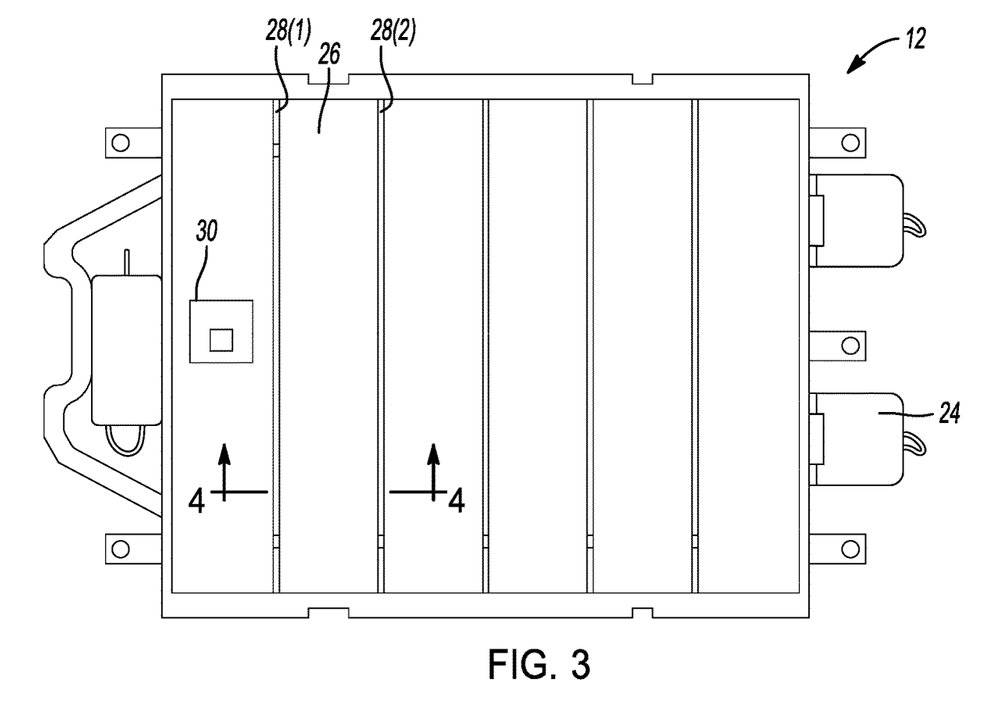
FIG. 3 is a top plan view of the battery pack of FIG. 2.

Referring to FIG. 4 and again to FIGS. 1 through 3, in order to collect any fluid leakage that may occur from the battery cells 30, and also to collect any moisture such as liquid that may enter the battery pack 12, each of the battery cell bays 26 can include a low point area 32 below the battery cells 30. Moisture or battery fluid entering any of the battery cell bays 26 collects at each low point area 32. Moisture collection into the battery cell bay low point areas 32 may be enhanced using weep holes 34 extending through each of the cross beams 28 to allow all fluid to collect in the low point areas 32.

Figure 4:
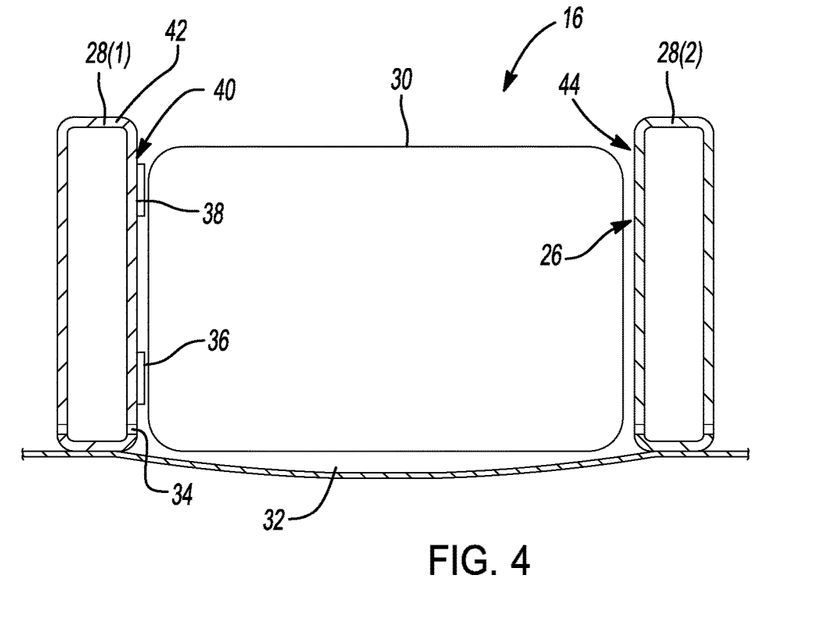
FIG. 4 is a cross sectional front elevational view taken at section 4 of FIG. 3.

Because the battery pack 12 within the frame 16 is not sealed and the battery cells 30 need to be cooled, air containing moisture may be present in the battery cell bays 26 in liquid, vapor and gaseous forms. Because air present in the battery cell bays 26 can naturally be saturated due to pressure and temperature, a single moisture sensor positioned in the battery cell bay 26 may signal a moisture problem if the relative humidity increases to approximately 100% RH, even though actual fluid may not be present. A signal from a single liquid sensor positioned only in the low point area 32 will therefore not provide assurance that fluid is actually present. To enhance the ability to distinguish if moisture as a liquid or in vapor or gaseous form is present in any of the battery cell bays 26, according to several aspects each battery cell bay 26 is provided with a first sensor 36 and a second sensor 38 each mounted to a side wall of one of the cross beams 28, such as to a side wall 40 of the cross beam 28(1). According to several aspects, the first sensor 36 and the second sensor 38 are each defined as moisture sensors.

The first sensor 36 is a low mounted sensor, mounted within the space defined by the low point area 32. Any liquid, liquid vapor or liquid in gaseous form can be sensed by the sensor 36 such as liquid or battery fluid present in the low point area 32. The second sensor 38 is identical to the first sensor 36, and is mounted to the same side wall as the first sensor 36, such as to the side wall 40 shown, but is mounted proximate to an upper end 42 of the cross beam such as to cross beam 28(1) shown.

As noted herein because air present in the battery cell bays 26 can naturally be saturated due to pressure and temperature, a single moisture sensor positioned in the battery cell bay 26 may signal a moisture problem if the relative humidity increases to approximately 100% RH, even though actual fluid may not be present. To avoid this situation, according to several aspects, an increase in the relative humidity of any individual battery cell bay 26 is determined by comparing a relative humidity measured as the output signal from the first sensor 36 in the battery cell bay 26 against a relative humidity measured as the output signal from the second sensor 38. Output signals from each of the first sensor 36 and the second sensor 38 are therefore periodically sampled and filtered, and the data is saved in a memory 48 shown and described in reference to FIG. 5.

Referring to FIG. 5 and again to FIGS. 1 through 4, an exemplary diagram of the vehicle battery safety sensor system 10 of the present disclosure provides the safety module 24 in communication with multiple sensors. The safety module 24 may provide computational capability and therefore includes features such as a central processor 46 and a memory 48 including an EEPROM. The safety module 24 receives output signals from each of multiple sensors such as a moisture-temperature sensor 50 positioned within the safety module 24, an accelerometer-impact sensor 52 located within the safety module 24, the first and second sensors 36, 38 mounted to each of the cross beams 28, at least one battery fluid-methane gas leak sensor 54, and multiple fire-smoke sensors 56. The safety module 24 coordinates at least one output signal indicating a condition of the battery pack 12 and the frame 16.

Figure 5:
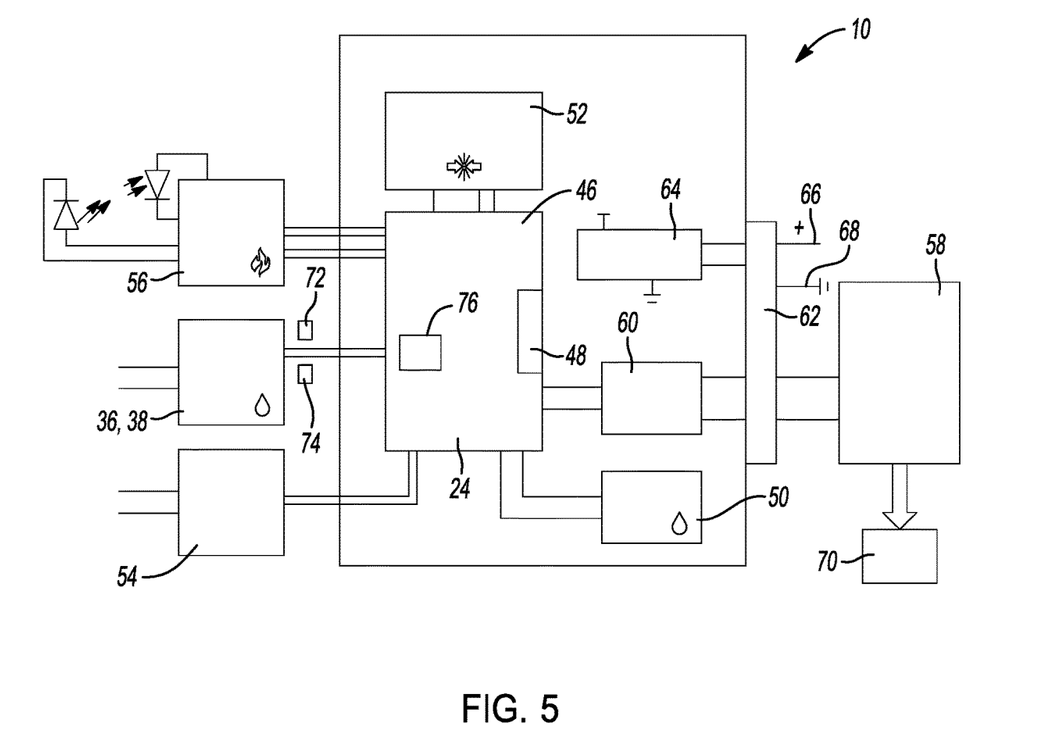
FIG. 5 is a diagrammatic presentation of the battery pack safety system for a battery powered vehicle according to an exemplary aspect.

The safety module 24 is in communication with a vehicle main computer such as a body control management unit (BCM) 58 via a high speed controller area network (CAN) interface 60. A connector 62 is provided with the safety system 10 providing power and communication terminals. A safety module power supply 64 is also connected via the connector 62 to a positive power terminal 64 and a ground terminal 68, thereby providing backup power for operation of the safety module 24 if power from the battery pack 12 is unavailable.

A warning module 70 is also in communication with the vehicle BCM 58, such that when a signal is forwarded by the safety module 24 any one or all of multiple different vehicle external warnings, including sounding of a vehicle horn or a separate sound emitting device in a pattern indicative of a condition of the battery pack 12 such as a rapid on-off sounding of the horn, flashing of either or both of the vehicle headlights or rear tail-lights in a pattern indicative of a condition of the battery pack 12 such as a predetermined on-off sequence, a remote signal sent via a wireless signal device, an internal message directed to the operator of the vehicle 14 such as a text message indicating the condition of the battery pack such as for example a smoke condition or structural damage to the frame 16, and the like can be initiated in the event of an output signal being transmitted from any one of the sensors of the vehicle battery safety sensor system 10.

Output signals from each of the first sensor 36 and the second sensor 38 are employed as follows. In a first test portion a predetermined quantity of successive sample data indicating a predetermined relative humidity difference exists between the output data of the first sensor 36 and the second sensor 38 is collected until the relative humidity difference exceeds a first threshold 72. In a second test portion after the relative humidity difference exceeds the first threshold 72 a determination is made if the relative humidity indicated by the lower or first sensor 36 is higher than a second threshold 74, for example above approximately 95% RH. When the relative humidity difference exceeds the first threshold 72 and the relative humidity indicated by the lower or first sensor 36 is higher than the second threshold 74, the vehicle battery safety sensor system 10 interprets this condition as fluid or a liquid volume being present in the battery cell bay 26 and generates a fluid present signal 76. When fluid is present the fluid present signal 76 is communicated to the safety module 24.

If desired, a particular battery cell bay 26 wherein one pair of the sensors 36, 38 triggers may be identified by the vehicle battery safety sensor system 10 of the present disclosure. Although the first sensor 36 and the second sensor 38 are depicted as shown in reference to FIG. 4 positioned on the side wall 40 of the cross beam 28(1), the first sensor 36 and the second sensor 38 can be mounted on the oppositely facing side wall 44 of the cross beam 28(2), and therefore the moisture sensors can be mounted on either side wall of a battery cell bay 26. To maintain consistency between samples taken by the first sensor 36 and the second sensor 38 and to minimize the time required to distinguish a changing moisture level, it is desirable that both sensors be mounted to the same side wall, although if arrangement limitations preclude this, each may be mounted to a different side wall.

Figure 6:
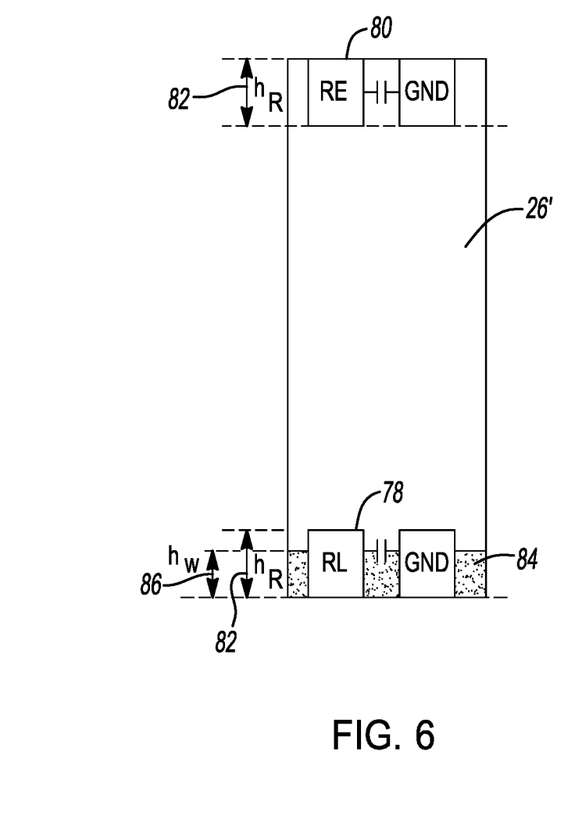
FIG. 6 is a diagrammatic presentation of capacitance sensors applied in the battery pack safety system for a battery powered vehicle of the present disclosure.

Referring to FIG. 6, a vehicle battery safety sensor system 10' is modified from the vehicle battery safety sensor system 10 to include an exemplary battery cell bay 26' wherein the first sensor 36 is replaced by a first sensor defining a capacitance sensor 78, and the second sensor 38 is replaced by a second sensor defining a capacitance sensor 80. Similar to the first sensor 36 and the second sensor 38, the capacitance sensor 78 and the capacitance sensor 80 are both mounted to the same side wall, such as to the side wall 40 shown in FIG. 4. As shown in FIG. 6, each of the capacitance sensor 78 and the capacitance sensor 80 provide an identical reference height $h_R$ 82 defining a range of detection. When no fluid is present in the battery cell bay 26', the output signal of the capacitance sensor 78 is equal to the output signal of the capacitance sensor 80. The battery cell bay 26' is depicted having a volume of liquid 84 having a reference height 86 $h_W$ which is less than or equal to the reference height $h_R$.

Referring to FIG. 7 and again to FIG. 6, each of the capacitance sensor 78 (shown) and the capacitance sensor 80 generate a capacitance field 88. The capacitance field 88 is ratiometric to a liquid level 90 of the liquid 84. The capacitance field 88 increases to a maximum field 92 in the presence of the liquid 84 and decreases substantially to a minimum field 94 above the liquid level 90 of the liquid 84. When no liquid is present the capacitance fields 88 of the capacitance sensor 78 and the capacitance sensor 80 are equal. One advantage of using capacitance sensors is that capacitance sensors do not need to directly contact liquid in the battery cell bay.

Figure 7:
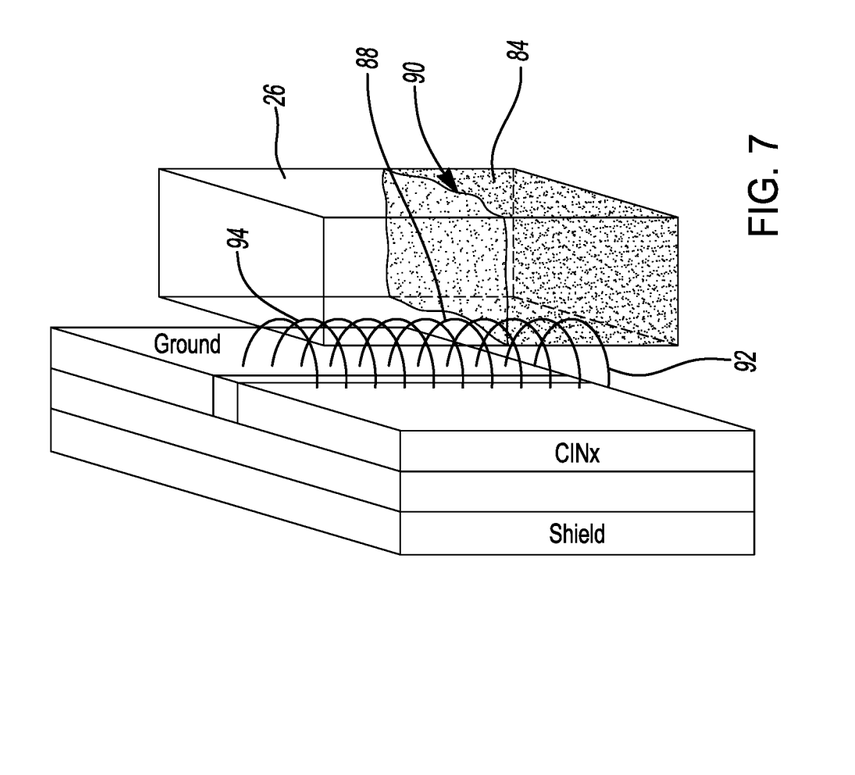
FIG. 7 is a front perspective view of the battery pack safety system for a battery powered vehicle of FIG. 6.

Referring to FIG. 8 and again to FIGS. 5 and 6 through 7, an exemplary diagram of the vehicle battery safety sensor system 10' of the present disclosure is modified from FIG. 5 to present an aspect utilizing capacitance sensors such as capacitance sensor 78 and capacitance sensor 80 in lieu of moisture sensors to identify if liquid fluid or water is present in the battery cell bay 26'. The output signals from the capacitance sensor 78 and the capacitance sensor 80 are fed to a capacitance-to-digital converter 96, which communicates with the safety module 24. Other features of the vehicle battery safety sensor system 10' are substantially the same as the vehicle battery safety sensor system 10.

Figure 8:
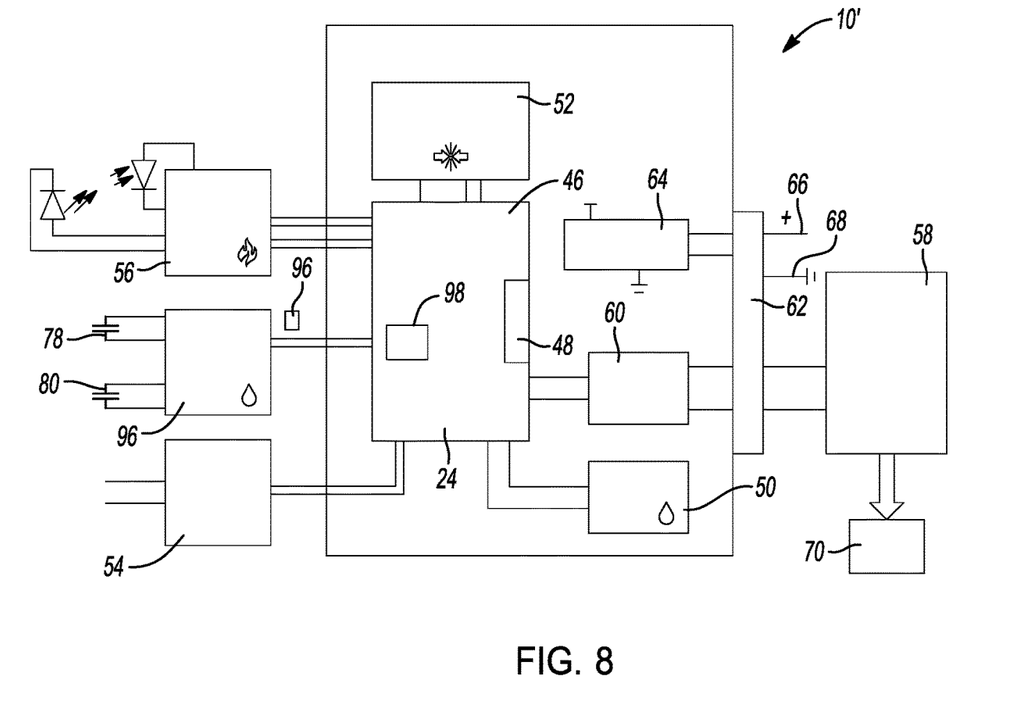
FIG. 8 is diagrammatic presentation of the battery pack safety system for a battery powered vehicle according to the further aspect presented in FIGS. 6 through 8.

Output signals from each of the capacitance sensor 78 and the capacitance sensor 80 are employed as follows. In a first test portion a predetermined quantity of successive sample data indicating a predetermined capacitance difference exists between the output signal of the first sensor 78 and the output signal of the second sensor 80 is collected until the capacitance difference exceeds a third threshold 96. When the capacitance difference exceeds the third threshold 96, the vehicle battery safety sensor system 10' interprets this condition as fluid or a liquid volume being present in the battery cell bay 26 and generates a fluid present signal 98. According to several aspects, the capacitance of the first sensor 78, the lower sensor, defines a liquid detection capacitance and the capacitance of the second sensor 80, the upper sensor, defines a reference capacitance.

A vehicle battery safety sensor system of the present disclosure offers several advantages. These include providing first and second sensors, one positioned above the other, which permit distinguishing between elevated humidity levels in a battery pack battery cell bay and the presence of a liquid in the battery cell bay. The first and second sensors can be identical to each other, with the sensors being capacitance sensors which do not need to directly contact liquid in the battery cell bay, or moisture detection sensors.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle battery safety sensor system providing liquid detection inside a battery pack, comprising:
    a battery pack having a structure defining a battery cell bay receiving a battery;
    a first sensor mounted to the structure proximate to a low point area of the battery cell bay for sensing an operating condition within the low point area of the battery cell bay;
    a second sensor mounted to the structure elevated above the first sensor for sensing an operating condition above the low point area of the battery cell bay; and
    a safety module processing signals received from the first sensor and the second sensor and identifying if the operating condition within the low point area of the battery cell bay defines a fluid present in the low point area of the battery cell bay, the safety module having memory for storing a condition of the battery cell, wherein the condition of the battery cell is defined as a liquid is present in the battery cell bay when a predetermined capacitance difference between a capacitance of the first sensor and a capacitance of the second sensor exceeds a predetermined threshold, and wherein the predetermined capacitance difference between the capacitance of the first sensor and the capacitance of the second sensor is ratiometric to a liquid level in the low point area of the battery cell bay.

2. The vehicle battery safety sensor system providing liquid detection inside a battery pack of claim 1, wherein the first sensor and the second sensor each define a capacitance sensor.

3. The vehicle battery safety sensor system providing liquid detection inside a battery pack of claim 2, further including a capacitance-to-digital converter receiving signals from each of the first sensor and the second sensor, the capacitance-to-digital converter in communication with the safety module.

4. The vehicle battery safety sensor system providing liquid detection inside a battery pack of claim 2, wherein the capacitance of the first sensor defines a liquid detection capacitance and the capacitance of the second sensor defines a reference capacitance.

5. A vehicle battery safety sensor system providing liquid detection inside a battery pack, comprising:
    a frame having four side walls connected to a bottom wall;
    a plurality of cross beams extending from an opposite two of the four side walls to define battery cell bays for storing batteries;
    a battery pack having multiple batteries, wherein each of the battery cell bays has at least one battery disposed therein positioned between the successive cross beams;
    a first moisture sensor mounted to a first one of the cross beams, the first moisture sensor positioned proximate to a low point area of the battery cell bay, the first moisture sensor configured to sense an operating condition within the low point area of the battery cell bay;
    a second moisture sensor mounted to the first one of the cross beams and elevated above the first moisture sensor, the second moisture sensor configured to sense an operating condition above the low point area of the battery cell bay;
    a safety module processing signals received from the first moisture sensor and the second moisture sensor and identifying if an operating condition within the low point area of the battery cell bay defines a liquid present in the battery cell bay; and
    wherein, when a relative humidity difference indicated by a first signal from the first moisture sensor differing from a second signal from the second moisture sensor exceeds a first threshold, and when a relative humidity indicated by the first signal from the first moisture sensor is higher than a second threshold, the operating condition in the battery cell bay is defined as a liquid present in the battery cell bay.

* * * * *